(12) United States Patent
Rosset et al.

(10) Patent No.: US 10,116,730 B2
(45) Date of Patent: Oct. 30, 2018

(54) PROCESSING METHOD, COMPUTER DEVICES, COMPUTER SYSTEM INCLUDING SUCH DEVICES, AND RELATED COMPUTER PROGRAM

(75) Inventors: Gaël Rosset, Chindrieux (FR); Benoît Schillings, Los Altos Hills, CA (US)

(73) Assignee: Myriad Group AG, Zurich (CH)

( * ) Notice: Subject to any disclaimer, the term of this patent is extended or adjusted under 35 U.S.C. 154(b) by 444 days.

(21) Appl. No.: 13/979,472

(22) PCT Filed: Jan. 10, 2012

(86) PCT No.: PCT/EP2012/050308
§ 371 (c)(1),
(2), (4) Date: Jan. 2, 2014

(87) PCT Pub. No.: WO2012/095420
PCT Pub. Date: Jul. 19, 2012

(65) Prior Publication Data
US 2014/0108487 A1    Apr. 17, 2014

(30) Foreign Application Priority Data

Jan. 13, 2011 (FR) ...................................... 11 50279
Aug. 17, 2011 (FR) ...................................... 11 57375

(51) Int. Cl.
*H04L 29/08* (2006.01)
*G06F 17/30* (2006.01)

(52) U.S. Cl.
CPC .......... *H04L 67/10* (2013.01); *G06F 17/3071* (2013.01); *G06F 17/30702* (2013.01)

(58) Field of Classification Search
CPC .................................................... H04L 67/10
(Continued)

(56) References Cited

U.S. PATENT DOCUMENTS 6,253,169 B1    6/2001 Apte et al.
2005/0262039 A1    11/2005 Kreulen et al.
(Continued)

FOREIGN PATENT DOCUMENTS

EP    1 975 813 A1    10/2008

OTHER PUBLICATIONS

International Search Report dated May 23, 2012 for International Application No. PCT/EP2012/050308.

*Primary Examiner* — Vivek Srivastava
*Assistant Examiner* — Sibte Bukhari
(74) *Attorney, Agent, or Firm* — Knobbe, Martens, Olson & Bear, LLP

(57) ABSTRACT

A processing method in a system including first and second computer devices, the second device receiving batches of data to be sorted into N categories is provided. According to the method, an algorithm for sorting into N categories, which is stored in the second device, is executed in the second device and determines a respective category from among the N categories for each batch of data; and an action is selectively triggered according to the category determined for the received data batches, respectively. The sorting algorithm may previously be obtained according to the following steps: i/ a data sample is generated for each of the N categories; ii/ according to the data received by the first device for the data samples, an algorithm for sorting into N categories is determined by the first device according to consecutive iterations of a definition algorithm executed in the first device.

14 Claims, 5 Drawing Sheets

(58) Field of Classification Search
USPC .......................................................... 709/201
See application file for complete search history.

(56) References Cited

U.S. PATENT DOCUMENTS

| | | |
|---|---|---|
| 2007/0050388 A1 | 3/2007 | Martin et al. |
| 2010/0049585 A1* | 2/2010 | McIntyre .......... G06F 17/30702 |
| | | 705/51 |
| 2010/0100607 A1* | 4/2010 | Scholz .............. G06F 17/30702 |
| | | 709/219 |

* cited by examiner

PROCESSING METHOD, COMPUTER DEVICES, COMPUTER SYSTEM INCLUDING SUCH DEVICES, AND RELATED COMPUTER PROGRAM

CROSS REFERENCE TO RELATED APPLICATIONS

This application is the U.S. National Phase of International Application No. PCT/EP2012/050308, filed Jan. 10, 2012, designating the U.S. and published as WO2012/095420 on Jul. 19, 2012 which claims the benefit of French Patent Application Nos. 11 50279 filed Jan. 13, 2011 and 11 57375 filed Aug. 17, 2011.

FIELD OF THE INVENTION

The present invention relates to the field of computer systems comprising first and second computer devices connected by a data link.

According to a first embodiment, the computer devices are computer servers.

More particularly, the invention relates to techniques for sorting batches of data received by the second computer device.

According to a second embodiment, the first device is a server and the second device is a user terminal from among user terminals adapted for communicating with a platform of services by means of a telecommunications network.

More particularly, the invention relates to techniques for sorting user terminals or users of those terminals by analyzing all of the data entered on those terminals, in particular in order to adapt the characteristics of the services provided by the platform according to the sort performed.

Below, reference will be made to the sorting of user terminals, but the invention indifferently applies to the sorting of users of those terminals.

BACKGROUND OF THE INVENTION

One known sort operating mode is described below in reference to FIG. 1.

The user terminals U1 to Uk are for example mobile telephones. They have access, through a 3G or Wi-Fi wireless communication network, to a platform of services S1, S2, . . . Ss. The services, delivered by service providers, for example comprise applications, sites or webpages. The mobile telephones are equipped with a software application of the "cookie" type, which copies the elements entered or selected by the user during operational use of the telephone to request or use services delivered by the platform, as well as services or applications that are local to the terminal or outside the platform. The software application transmits those elements to the analysis engine 2.

Thus, when the users of the user terminals U1 to Uk write e-mails, SMS messages or keywords in a search engine, select Internet links, enter information on Facebook pages, or browse selected websites, all of those elements are transmitted to the platform of services to perform the concerned service, respectively sending e-mails or SMS ("short message service") or MMS ("multimedia message service") messages, providing results for the keyword search, displaying selected websites, or updating the Facebook page. Furthermore, these elements, which are associated with an identifier of the device (or similarly an identifier of the user), are transmitted to the analysis engine 2 in parallel.

When the analysis engine 2 receives these format and/or content elements of varied and unknown natures, it determines, according to the identifier associated with the elements, the sorting search or searches to be done on the various elements.

The sorting searches are therefore done from data whereof the form, nature and meaning are unknown. These searches may be varied and may aim to characterize the age, gender, areas of interest and/or expectations of the user in terms of quality/speed of service, technical constraints encountered, etc.

In one example, a first sorting search serves to select a class from among the following: "child," "adult," "senior." Another sorting search for example serves to select a class from among the following: "soccer fan," "golf fan," "cycling fan," "tennis fan."

Once the sorting search, called $RC_A$, to be conducted on elements associated with an identifier is determined, the analysis engine 2 analyzes those elements using rules, keywords, algorithms, dictionaries, grammars, present in the database 3 so as to select the relevant class from among the different classes, called $C_{RCA1}, C_{RCA2}, \ldots, C_{RCAn}$ associated with that sorting search.

One or more actions are then triggered intended for the considered user terminal, depending on the class selected for that user terminal.

The Google analytics tool is also known.

Furthermore, document WO 01/20481 describes a system for determining the profiles of users using the user terminals to browse the web. According to this document, a remote POP ("Point Of Presence") server providing Internet access collects and stores the URL ("Uniform Resource Locator") address requests transmitted by the terminals matched with the users' identifiers. An analysis engine ("client profiling component") of the POP server then next determines a profile for the users, or updates it, based on the collected data and information from a database containing a copy of a database from the so-called master server. This information contains demographic characteristics allocated to URL addresses, such as those corresponding to the "Nielsen Net Ratings" service. The Nielsen Net Ratings data are established by observing a sample of the population and noting the sites they visit: profiles are associated with particular websites.

These techniques nevertheless have a certain number of drawbacks.

First, the elements entered by the user during operational use of the mobile telephone are sent to a remote server, in association with the user's identifier, which poses major security and confidentiality issues, since these elements may include information that the user does not wish to have disclosed in this way. Encrypting the transmission does not prevent the possibility of fraudulent use of the information at the analysis server, particularly given that those elements are frequently stored for a certain amount of time so as to be reused by the server to refine the sorting done in a first stage.

Such a transmission of information without prior consent from the users is also detrimental.

Furthermore, the processing done by the analysis engine requires a very significant volume of computation resources, and the volume of the database is also quite significant.

SUMMARY OF THE INVENTION

The aim of the invention is to propose a processing method making it possible to resolve the aforementioned problems.

To that end, the invention relates to a processing method in a system comprising first and second computer devices that are connected together by a data link, the second device receiving batches of data to be sorted into N categories, according to which:

an algorithm for sorting into N categories, which is stored in the second device, is executed in the second device and determines a respective category from among the N categories for each batch of data;

an action is selectively triggered according to the category determined for said received data batches, respectively, the algorithm for sorting into N categories being previously obtained according to the following steps:

i/ a data sample is generated for each of the N categories;

ii/ according to the data received by the first device for the data samples, an algorithm for sorting into N categories is determined by the first device according to consecutive iterations of a definition algorithm executed in the first device.

According to other advantageous aspects of the invention, the processing method comprises one or more of the following features, considered alone or according to any technically possible combinations:

the sorting algorithm includes sorting rules, each sorting rule being associated with one from among the plurality of categories, each sorting rule including at least one logic sequence aiming to selectively associate at least one determined key element with a given category;

during step ii/, a key element is removed from the data received when the number M of inclusions of that key element in a set of several sorting rules determined during the previous iterations is greater than or equal to 2, preferably equal to 3 or 4;

during step ii/, each sorting rule is evaluated from test copies for each category, and the evaluation is weighted according to the number of test copies in each category;

the first computer device is a server and the second computer device is a user terminal from among a plurality of user terminals connected to a platform of services through a telecommunications network, the batches of data received are data entered on the user terminals and transmitted on the network to the platform of services and also transmitted to the server, the sorting algorithm determines, for each user terminal, a respective category from among the N categories, according to the data entered on the user terminal and transmitted on the network to the platform of services, the action is selectively triggered to at least some of said terminals according to the category respectively determined for those terminals, during step i/, the data sample is a sample of user terminals formed for each of the N categories, the data entered on the user terminals and transmitted on the network by the user terminal to the platform of services further being transmitted to the server.

Such a method makes it possible to considerably increase the usage security and confidentiality of the data freely entered by the operator during the operational use "spied upon" by the sorting algorithm.

In fact, it only gives rise to the copy and transmission for analysis purposes for sorting of the entered data in a single, temporally limited phase for defining the sorting algorithm. Additionally, this definition phase only relates to a very small number of users, since it only concerns a sample of user terminals for each category.

The method according to the invention thus makes it possible to sort the terminals, and if applicable to perform determined actions according to that sort, while having the advantage of not, to perform the sort, requiring a specific, dedicated transmission of the data entered on a user terminal, or an analysis or storage of that data outside the user terminal, outside the phase for obtaining the sorting algorithm.

According to other advantageous features of the invention, the processing method comprises one or more of the following features, considered alone or according to any technically possible combinations:

the sorting algorithm has been downloaded into the user terminals by the network;

the action is commanded by the platform of services in response to the transmission by the user terminal of an indication of the determined category at the platform of services;

the action includes a request to send the user terminal a sorting algorithm in sub-categories of the category determined for that user terminal;

steps i, ii and iii having been reiterated, if the sorting algorithm according to the N categories that obtained is distinct from the sorting algorithm according to the N categories stored in the second device, the sorting algorithm according to the N categories then obtained is downloaded and stored in the second device;

the analysis of the data done by the sorting algorithm is made up exclusively of the detection of words and logic combinations of detected words.

The invention also relates to a first computer device equipped with a memory and a central processing unit, and capable of receiving data for samples formed for each of N categories, in which a sorting algorithm based on the N categories is determined by the first device according to successive iterations of a definition algorithm executed in the first device.

The invention also relates to a second computer device equipped with a memory and a central processing unit, and capable of receiving batches of data to be sorted among N categories, in which a sorting algorithm based on the N categories, stored in the memory and executable on the central processing unit, is adapted to determine, for each received batch of data, a respective category from among N categories;

said sorting algorithm among the N categories having previously been obtained using the following steps:

i/ a data sample is formed for each of the N categories;

ii/ according to the data received by a first computer device for the data samples, the sorting algorithm based on the N categories is determined by the first computer device according to successive iterations of a definition algorithm executed in the first computer device.

According to other advantageous aspects of the invention, the second computer device comprises one or more of the following features, considered alone or according to any technically possible combinations:

the second computer device is a user terminal from among a plurality of user terminals connected to a platform of services by a telecommunications network, the batches of data received are data entered on the user terminals and transmitted on the network to the platform of services and also transmitted to the first computer device, the sorting algorithm adapted for determining, for each user terminal, a respective category from among the N categories, based on the data entered on the user terminal and transmitted on the network to the platform of services, during step i/, the data sample is a sample of user terminals formed for each of the N categories, the data entered on the user terminals and transmitted on the network by the user terminal to the platform of services further being transmitted to the first computer device;

the second device is further adapted for transmitting, on the telecommunications network, an indication of the determined category for said user terminal;

the second device is adapted, based on the determined category, for transmitting a request relative to a sorting algorithm within subcategories of the category determined for said user terminal.

The invention also relates to a computer system comprising first and second computer devices as considered above and connected by a data link.

The invention also relates to a computer program to be installed in a second computer device equipped with a memory and a central processing unit, comprising instructions for carrying out the following steps when the program is executed by the central processing unit of the second computer device, the second device receiving batches of data to be sorted among N categories, the second device being connected to a first computer device by a data link, said computer program comprising a sorting algorithm into N categories:

executing the sorting algorithm into N categories, stored in the memory and executable on the central processing unit, adapted for determining, for each batch of data, a respective category from among N categories;

said sorting algorithm according to the N categories having previously been obtained according to the following steps:

i/ a data sample is formed for each of the N categories;

ii/ according to the data received by the first device for the data samples, the sorting algorithm according to the N categories is determined by the first device according to successive iterations of a definition algorithm executed in the first device.

According to another advantageous aspect of the invention, the computer program comprises the following feature:

the first computer device is a server and the second computer device is a user terminal from among a plurality of user terminals connected to a platform of services by a telecommunications network, the batches of data received are data entered on the user terminals and transmitted on the network to the platform of services and further transmitted to the server, the sorting algorithm determines, for each user terminal, a respective category among the N categories, according to the data entered on the user terminal and transmitted on the network to the platform of services, during step i/, the data sample is a sample of user terminals formed for each of the N categories, the data entered on the user terminals and transmitted on the network by the user terminal to the platform of services further being transmitted to the server.

BRIEF DESCRIPTION OF DRAWINGS

Other features and advantages of the invention will also appear upon reading the following description. This description is purely illustrative and must be read in light of the appended drawings, in which:

In FIG. 2, the computer system 10 comprises a first computer device 12, 107 and a second computer device 14, 100 connected by a data link 16, 101.

DETAILED DESCRIPTION OF THE EMBODIMENTS

The first computer device 12, 107 is capable of performing successive iterations of a definition algorithm 18, 109 to determine a sorting algorithm 20, 108, the sorting algorithm 20, 108 being designed to be stored in the second computer device 14, 100 so that it may be executed by the second computer device 14, 100.

Figure 1:
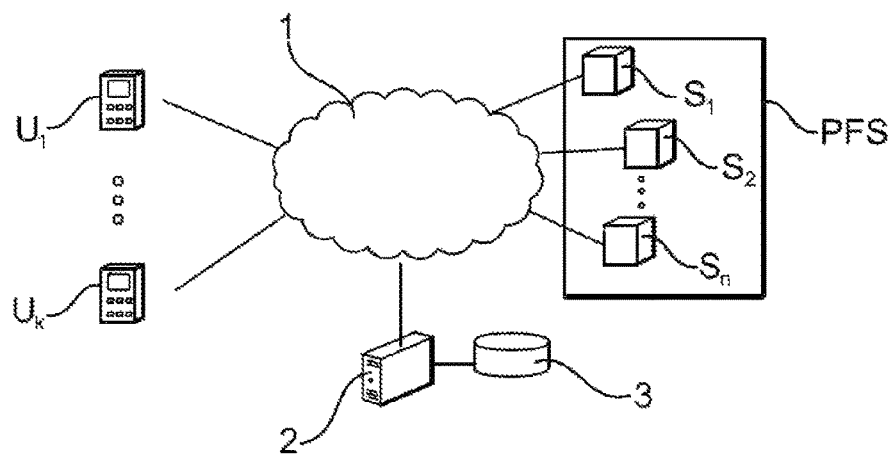
FIG. 1 is a view of a sorting mode of the prior art.
Figure 2:
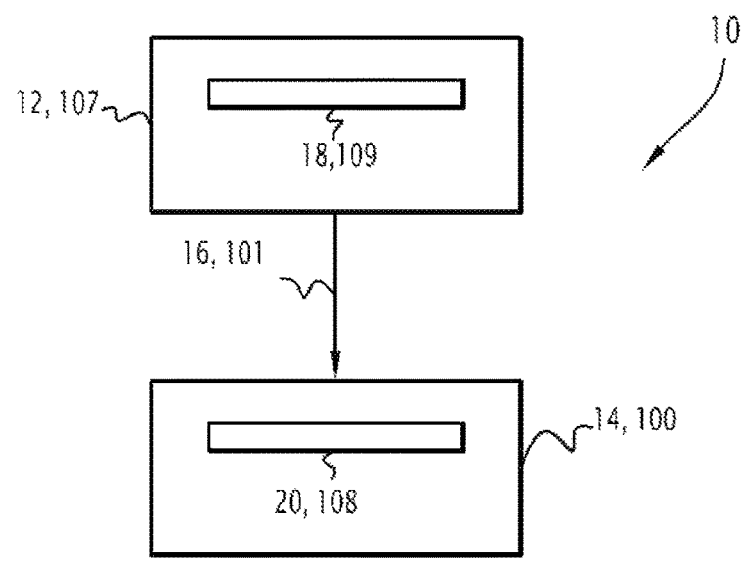
FIG. 2 is a diagrammatic view of the computer system according to the invention.
Figure 3:
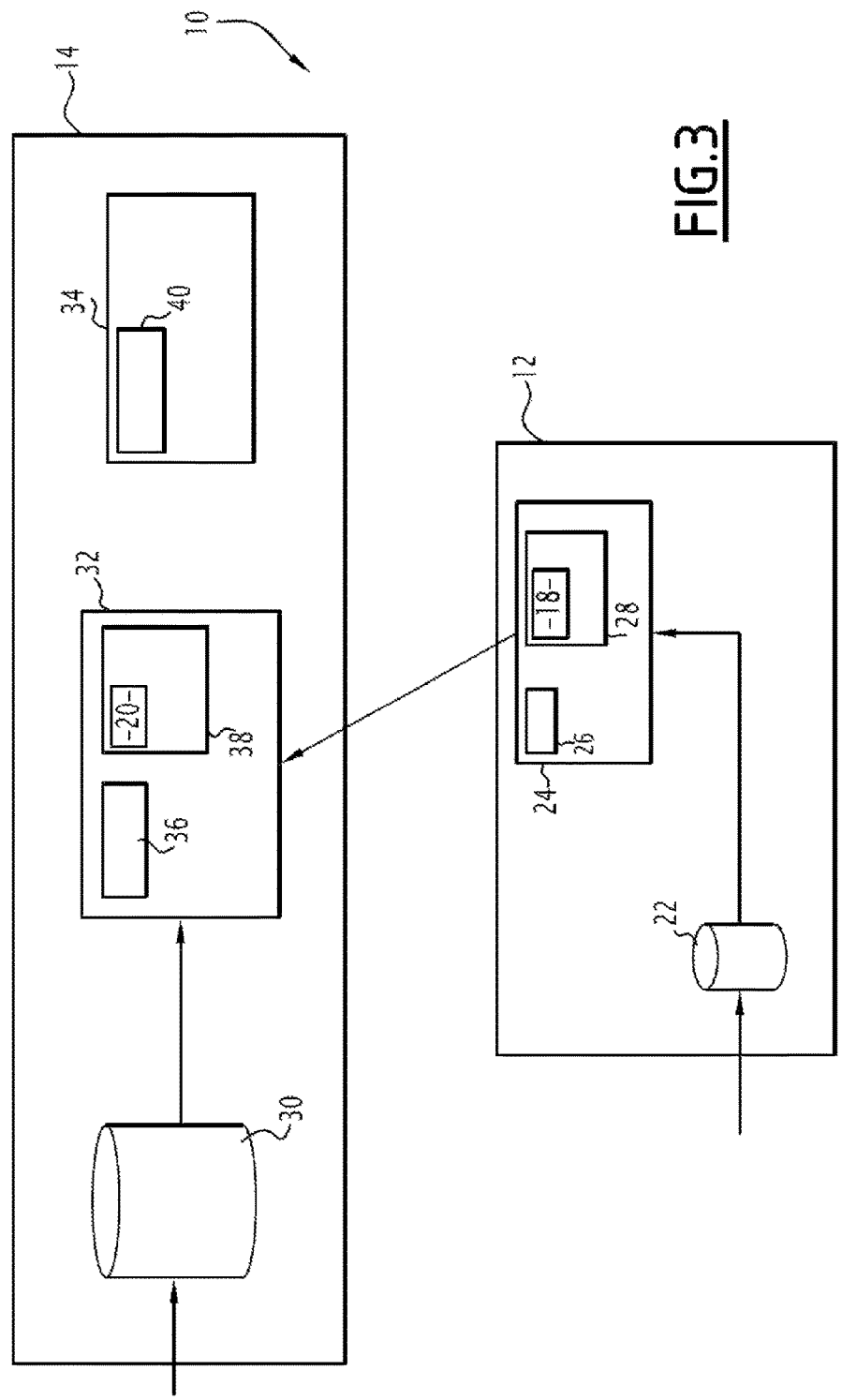
FIG. 3 is a detailed view according to a first embodiment of the invention.

According to a first embodiment, shown in FIG. 3, the first computer device 12 comprises a first database 22 and a first information processing unit 24, the first information processing unit including a first microprocessor 26 and a first memory 28. The first memory 28 is capable of storing the definition algorithm 18.

The second computer device 14 comprises a second database 30, a second information processing unit 32 and a unit 34 for exploiting the results of the sort. The second information processing unit 32 includes a second microprocessor 36 and a second memory 38 capable of storing the sorting algorithm 20.

In the example embodiment of FIG. 3, the first computer device 12 and the second computer device 14 are two distinct computer servers. In an alternative that is not shown, the first computer device and the second computer device form a single computer server.

The data link 16 is, for example, a wired link, for example fiber-optic. Alternatively, the data link 16 is a wireless link.

Figure 4:
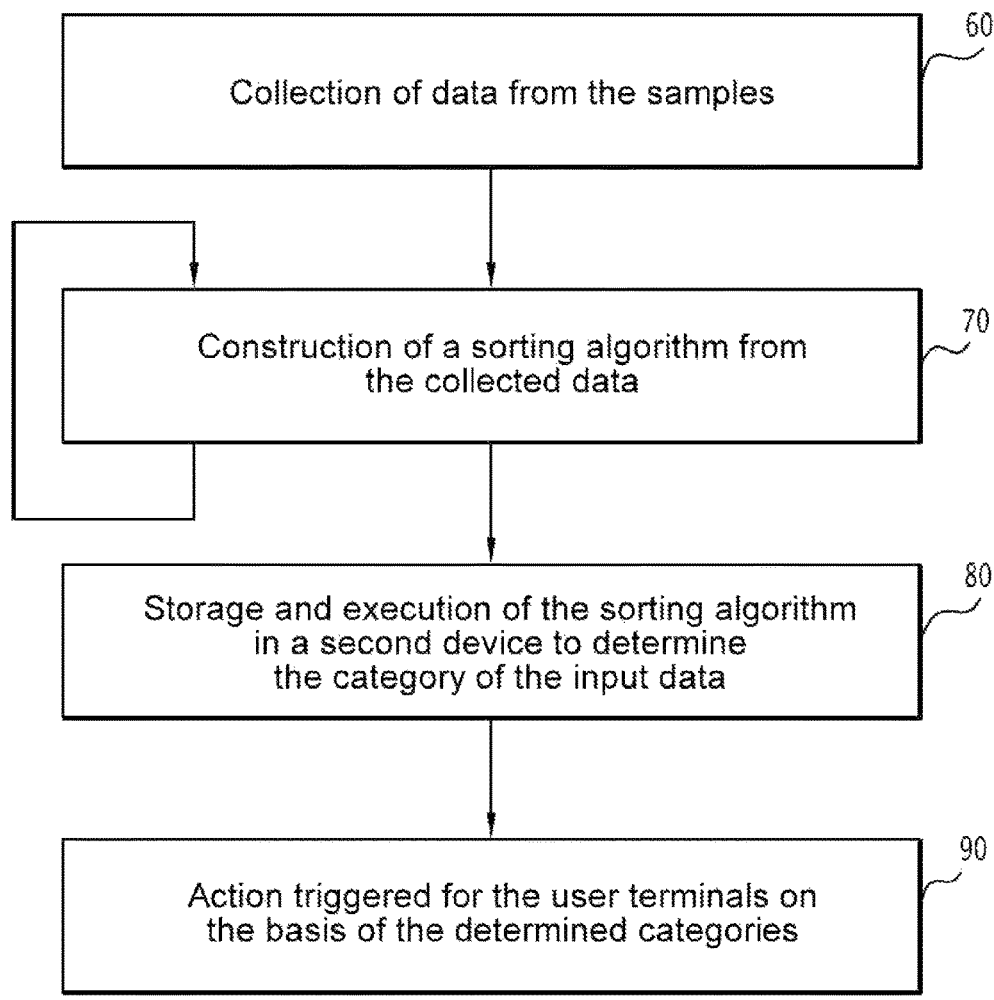
FIG. 4 is a flowchart of a method according to the first embodiment of the invention.

The definition 18 and sorting 20 algorithms will be described in more detail hereafter in light of FIG. 4.

The first database 22 is designed to receive data, in particular data feeds, such as RSS (Really Simple Syndication) feeds. The data feeds are updated regularly, and the data stored in the first database 22 are updated regularly.

The first microprocessor 26 is capable of executing, through successive iterations, the definition algorithm 18 recorded in the first memory 28, to determine the sorting algorithm 20 according to the data received and stored in the first database 22.

The second database 30 is designed to receive batches of data to be sorted among N categories, N being an integer greater than or equal to 2.

The unit for exploiting the result of the sort 34 includes a man-machine interface 40, and is capable of selectively triggering an action based on the category respectively determined for the received batches of data.

The second microprocessor 36 is capable of executing the sorting algorithm 20 stored in the second memory 38, to determine the category from among the N categories of each of the batches of data received and stored in the second database 30.

The man-machine interface 40 is adapted for displaying the results of the sort, for example in the form of graphs.

The processing method according to the first embodiment is described below, in reference to FIG. 3 as well as the flowchart of FIG. 4.

Let us consider N determined categories $cat1_{CL1}$, $cat2_{CL1}$, ..., $catN_{CL1}$ of a sort CL1.

For example, the sort CL1 comprises the following N=3 categories: "child," "adult," "senior." In another example, the sort CL1 comprises the following N=6 categories: "soccer fan," "golf fan," "cycling fan," "tennis fan," "other sports fan," "not a sports fan." In another example, the sort CL1 comprises the following N=4 categories: "soccer fan," "golf fan," "cycling fan," "tennis fan."

When one wishes to determine whether each of the batches of data received and stored in the second database 30 is in a determined category from among these N categories, a first phase is initiated.

In a step 60, for each of the categories $cat1_{CL1}$, $cat2_{CL1}$, ..., $catN_{CL1}$, a sample of data feeds established as belonging to the category is formed.

For example, the number of data feeds in each sample is greater than 100.

During step 60, the data of each data feed are updated regularly.

In a step 70, for each of these data collected over time and the known category of the user terminal from which it comes, the definition algorithm 18 models the sorting algorithm 20 according to the categories $cat1_{CL1}$, $cat2_{CL1}$, ..., $catN_{CL1}$.

The definition algorithm 18 thus builds the sorting algorithm 20 using a learning mechanism from these data coming from the data feed with a known category.

The definition algorithm 18 is for example of the genetic programming type, or inverse propagation method, fuzzy classifiers, Bayesian networks, neuron networks (for example, see McCallum, A. and Nigam K. "A Comparison of Event Models for Naive Bayes Text Classification". In AAAI/ICML-98 Workshop on Learning for Text Categorization, pp. 41-48. Technical Report WS-98-05. AAAI Press. 1998; Prinzie, A., Van den Poel, D. (2008). Random Forests for multiclass classification: Random MultiNomial Logit, Expert Systems with Applications, 34(3), 1721-1732), etc.

As new data is collected, the definition algorithm 18 is reiterated while refining and completing the rules defining the sorting algorithm 20 in particular according to said new data and optionally data previously collected, for example as long as the sorting algorithm 20 allocates collected data corresponding to a given category among the N categories, to a different category from the given category (or as long as the sort error rate of the data by the sorting algorithm 20 is above a predetermined threshold).

The sorting algorithm 20 is thus built iteratively, dynamically, as new data is collected.

This algorithm is adapted to determine, according to data provided to it as input data, whether the data come from a batch of data falling into a category among the categories $cat1_{CL1}$, $cat2_{CL1}$, ..., $catN_{CL1}$, and to indicate what that category is.

The roles comprised in the sorting algorithm 20 for example include the detection of certain keywords and decision trees combining detected words and/or the non-detection of words by logic functions (AND, OR, AND NOT, CLOSE TO, etc.).

For example, a decision tree to determine whether the data refer to soccer might be "IF (THE WORD goal) AND ((THE WORD forward) or (THE WORD corner)) IS IN THE DATA=>THEN THE DATA REFERS TO SOCCER."

Such a method thus gives rise to a small sorting program, executable on devices with reduced computation and memory resources, and which is nevertheless very effective.

For example, approximately one hundred rules or algorithms capable of detecting a soccer text will only require 100*(50 bytes)=5,000 bytes, or a little less than 5 kB per category, which is negligible in terms of size.

These algorithms enable a practically instantaneous sorting evaluation on current computer devices.

In one embodiment, the data analysis done by the sorting algorithm 20 is very simple and made up exclusively of the detection of words and logic combinations of detected words.

In other words, the sorting algorithm 20 includes sorting rules, each sorting rule being associated with one among the plurality N of categories, each sorting rule including at least one logic sequence aiming to selectively associate at least one determined key element with a given category.

If a key element, such as 'goal,' 'forward' and 'corner' in the previous example, appears M times in a set of several sorting rules determined during previous iterations, for example the sorting rules corresponding to the given category, M being an integer greater than or equal to 2, preferably equal to 3 or 4, then that key element is removed from the data received and stored in the first database 22.

In other words, when the number M of inclusions of the key element in a set of several sorting rules determined during previous iterations is greater than or equal to 2, preferably equal to 3 or 4, then the key element is removed from the data stored in the first database 22, i.e., from the dictionary serving for learning of the sort rules.

This makes it possible to guarantee that this key element will not appear in the next sorting rules, and to then obtain a greater diversity of sorting rules. Removing a key element that appears too often from the first database 22 makes it possible to improve the sorting algorithm 20 obtained at the end of step 70.

During step 70, each sorting rule is evaluated from test copies for each category, and the evaluation is weighted according to the number of test copies in each category. This weighting makes it possible to have an evaluation that does not depend on the number of test copies in each category. This then makes it possible to evaluate the sorting algorithm 20 uniformly from one category to the next irrespective of the number of test copies in each category.

Once this definition phase of the sorting algorithm 20 is done, in a step 80, the sorting algorithm 20 is provided to the second computer device 14. It is downloaded into the second memory 38 of the second information processing unit using the data link 16 from the first computer device 12.

The sorting algorithm 20 is executed using the second microprocessor 36.

The sorting algorithm 20 has, as input data, the batches of data to be sorted simultaneously or successively received by the second device 14 and stored in the second database 30.

The sorting algorithm 20 thus determines whether each batch of data falls under one of the categories $cat1_{CL1}$, $cat2_{CL1}$, ..., $catN_{CL1}$, and if it does, the sorting algorithm 20 determines that category.

In a step 90, a corresponding action is then triggered that is targeted with respect to the determined category.

In one embodiment, each category is associated with words that make it possible to execute the sort on all types of data, and not only on websites as in the solutions of the prior art using the Nielsen Net Ratings data. The sort is therefore further more refined.

The volume of necessary resources (computations and databases) is also significantly reduced with respect to the prior art.

A method according to the invention further makes it possible to faithfully and quickly monitor the evolutions of the data to be sorted, the samples of which are representative. In fact, steps 60 and 70 for defining a sorting algorithm according to the categories $cat1_{CL1}$, $cat2_{CL1}$, ..., $catN_{CL1}$ can be reiterated regularly from the same samples or other samples.

Regularly updating the samples, such as the RSS feeds, makes it possible to update the sorting rules of the sorting algorithm by reiterating steps 60 and 70 from the same samples.

If the sorting algorithm provided at the end of this reiteration of steps 60 and 70 is different from that previously determined, which corresponds to an evolution in the data to be sorted, this new sorting algorithm is provided to the second device 14, for example by downloading, replacing the preceding algorithm.

For example, during a popularity peak of the "Pokémon" characters in children, it may be determined by the definition algorithm, based on collected data, that the occurrence of the word "Pokémon" characterizes the category of children and it is therefore useful to add a rule pertaining to the detection of the word "Pokémon" to determine whether a user terminal is being used by a "child," "adult," or a "senior."

A method according to the invention may build sorting algorithms in any number of categories and for all sorts of categories.

Figure 5:
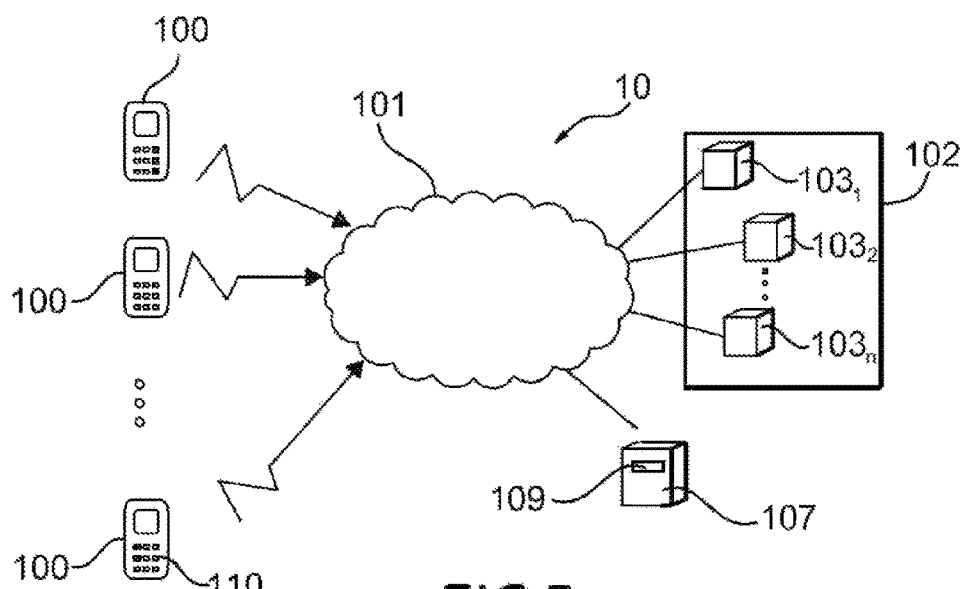
FIG. 5 is a view similar to that of FIG. 3 according to a second embodiment of the invention.
Figure 6:
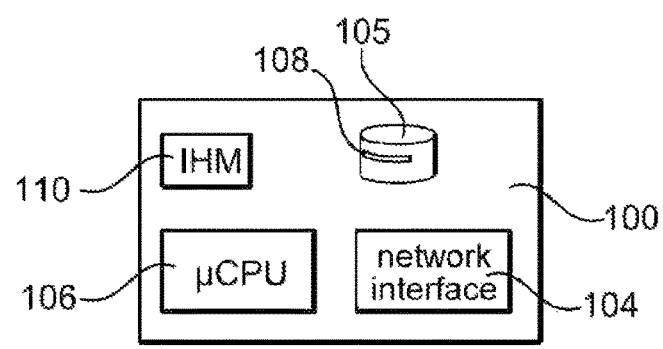
FIG. 6 is a view of a user terminal according to the second embodiment of the invention.
Figure 7:
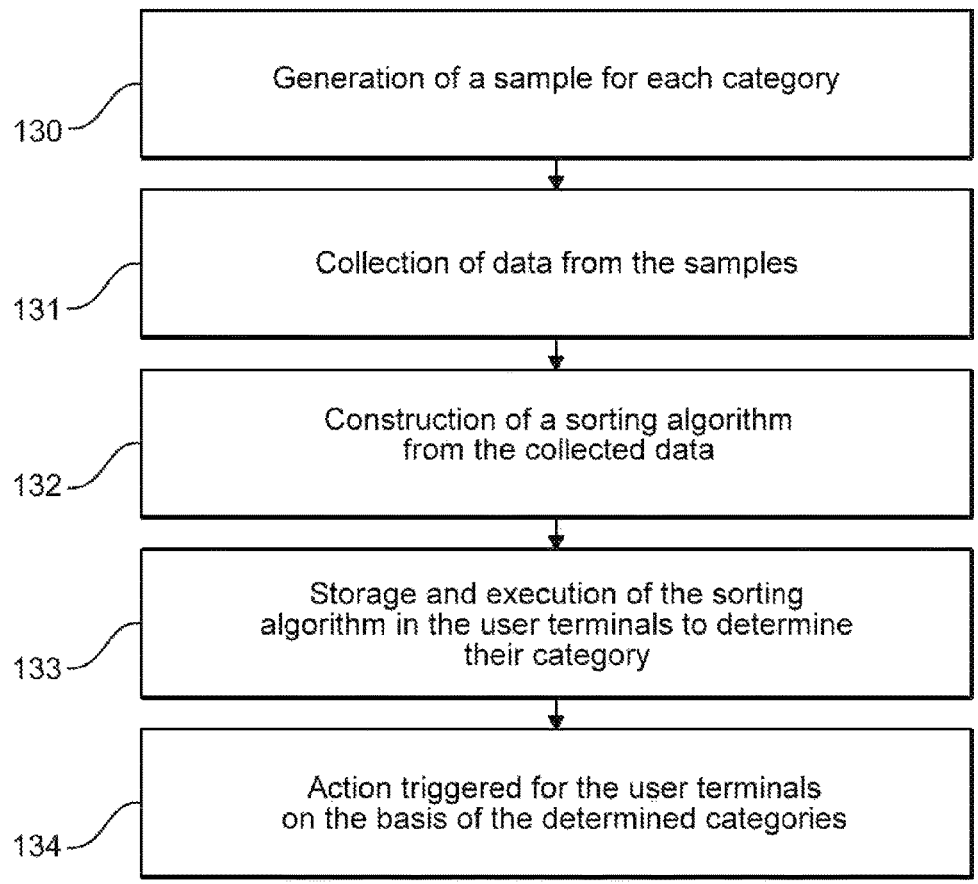
FIG. 7 is a view similar to that of FIG. 5 according to the second embodiment of the invention.

FIGS. 5 to 7 illustrate a second embodiment of the invention.

In FIG. 5, the system 10 includes user terminals 100, a telecommunications network 101 and a platform of services 102.

The user terminals 100 are for example mobile telephones, personal digital assistants (PDA), televisions, set-top boxes associated with television sets to perform various functions not performed by the television set itself, such as receiving a conditional access audiovisual program, access to interactive services, the reception of digital programs, etc.

The user terminal 100, shown in FIGS. 5 and 6, includes:
- a man/machine interface (MMI) 110 in particular adapted for picking up data provided by their user, for example a keypad, microphone, etc., in particular in the context of the request or the use of services provided to the user;
- a network interface module 104 adapted for transmitting data on the network 101, and optionally for receiving data transmitted to the user terminal on the network 101;
- a memory 105;
- a microprocessor 106.

The services requested by the user for example comprise services executed locally at the user terminal, using applications executable in the terminals and/or services delivered by service providers $103_1$, $103_2$, ... $103_r$, equipped with servers connected to the telecommunications network 101 and which are for example elements of the platform of services 102.

In the case where the services are not locally accessible to the terminal 100, the data entered by the user using the MMI 110 defining service or service use requests are transmitted by the network interface module 104 of the terminal to the servers of the providers of the concerned services.

The servers of the service providers $103_1$, $103_2$, ... $103_n$ are adapted for receiving the data transmitted to them by the user terminals and providing services according to that data. These services are provided by means of the network 101 or by other routes.

In the concerned example, the user terminals 100 are for example mobile telephones. The network 101 provides them with a mobile telephone service with telephone calls and SMS and MMS messages and further allows access to Internet services: Internet browsing, search engines, e-mails, Internet link selection, access to social networks such as Facebook, Twitter, downloading files, etc.

The processing method according to the second embodiment is described below, in reference to FIGS. 5 and 6 and also in reference to the flowchart of FIG. 7.

Let us consider N determined categories $cat1_{CL1}$, $cat2_{CL1}$, ..., $catN_{CL1}$ of a sort CL1 similarly to the first embodiment.

When one wishes to determine whether each of the user terminals 100 (or a subset of those terminals) is in a determined category from among said N categories, a first phase is undertaken.

In a step 130, for each of the categories $cat1_{CL1}$, $cat2_{CL1}$, ..., $catN_{CL1}$, a sample is formed of user terminals identified as belonging to that category.

For instance, the number of terminals of each sample is for example comprised between 200 and 500. The number of terminals used in the learning phase is for example in a ratio comprised between 1/1000 and 1/100, or even less for very dense analyzed populations.

Thus, it is possible to consider using a population of 1000 people (4*250 for each category) to then analyze a population of 100,000 people.

Each terminal that is part of the samples is provided, for example by downloading using the network 101, with a software application of the "cookie" type, for storage in the memory 105.

This "cookie" software application, which is then executed on the microprocessor 106, serves to copy the data entered or selected by the user during the operational use of the user terminal to request or use services delivered by the platform 102 or services or applications that are local to the terminal or outside the platform. These data are transmitted, if applicable, on the network to the platform 102 in the context of the operational use of the services. Thus, when the users of the user terminals of the samples write e-mails, SMS messages, or keywords in a search engine, select Internet links, fill in Facebook pages and/or browse selected websites, all of these data entered or selected are transmitted with a user terminal (or user) identifier to the platform of services 102 to perform the concerned service, respectively sending e-mails or SMS messages, providing keyword search results, displaying the selected webpages or updating the Facebook page.

In one embodiment, the "cookie" application can pick up all of the text entered by the user on the terminal.

The "cookie" software application also provides a copy of that data to an algorithm definition server 107, by means of the network 101 (or using other routes).

Thus, in a step 131, the data copied in the user terminals of the samples are collected and processed with the stream by the algorithm definition server 107.

In other words, the algorithm definition server 107 forms the first computer device, and each of the user terminals 100 is a second computer device, the network 101 forming the data link between the first and second devices.

In a step 132, from each of these data collected with the stream and the known category of the user terminal from which it comes, a definition algorithm 109 models a sorting algorithm 108 according to the categories $cat1_{CL1}$, $cat2_{CL1}$, ..., $catN_{CL1}$.

The definition algorithm 109 thus builds the sorting algorithm 108 using a learning mechanism from these data coming from the user terminals with a known category.

The definition algorithm 109 is similar to the definition algorithm 18 of the first embodiment, and reiterated in the same way.

The sorting algorithm 108 is therefore similar to the sorting algorithm 20 of the first embodiment, and iteratively and dynamically builds new collected data overtime.

This algorithm is adapted for determining, according to data provided to it as input data, whether the data come from a user device falling within a category from among the categories $cat1_{CL1}$, $cat2_{CL1}$, ..., $catN_{CL1}$, and indicating what category that is.

The rules comprised in the sorting algorithm 108 are similar to the sorting rules of the sorting algorithm 20 of the first embodiment.

These algorithms allow a practically instantaneous sort evaluation on the current terminals.

Once this definition phase of the sorting algorithm 108 is done, in a step 133, the sorting algorithm 108 is provided to the set of user devices 100 to be sorted. It is for example downloaded in the user terminals using the communication network 101 from the algorithm definition server 107 or from another module. It may for example be provided by SMS or USSD (Unstructured Supplementary Service Data). The sorting algorithm 108 is stored in the memory 105 of the terminals to be sorted.

The sorting algorithm 108 is executed using the microprocessor 106.

In each user terminal, the sorting algorithm 108 has, as input data, the data successively input by the user on the user terminal and designed for the request or operational use of services.

The sorting algorithm 108 thus determines, using the data successively entered by the user on the user terminal, whether the user terminal falls into one of the categories $cat1_{CL1}$, $cat2_{CL1}$, ..., $catN_{CL1}$, and if yes, the sorting algorithm 108 determines that category.

Several options, which may be cumulative, are then possible in a step 134, so as to trigger an action intended for the user terminal that is targeted with respect to the determined category.

According to one option, the sorting algorithm 108 includes an instruction that commands sending the identifier of the user terminal and the corresponding category to a determined server, for example a server of the platform of services 102, or another, so that respective actions selected according to the determined category are generated therein intended for the user, in a targeted manner with respect to the latter's profile determined by the sort.

The targeted actions may be the transmission to certain terminals of targeted information, the provision of targeted software applications based on the determined category, the redirection of requests from certain users to specialized sites, etc. Actions may also be the provision of MMIs adapted based on the sort (for example, MMIs simplified for young children and seniors, MMIs with specialized functions, the restriction of content in particular for minors, etc.).

According to another option, the sorting algorithm 108 includes instructions defining respective actions based on the determined category, for example which command sending the identifier of the user terminal to respective URL addresses determined according to the category, to generate specific actions intended for the user, targeted relative to the latter's profile determined by the sort.

According to another option, once the category is determined from among $cat1_{CL1}$, $cat2_{CL1}$, ..., $catN_{CL1}$, the sorting algorithm 108 makes a request using the network 101, for example to the algorithm definition server 107, to download a sub-sorting algorithm in the determined category, so as to process the data already processed using the sorting algorithm 108 according to the categories $cat1_{CL1}$, $cat2_{CL1}$, ..., $catN_{CL1}$ or new data entered1 by the user of the user terminal to determine the sub-category to which the user terminal belongs. For example, if the determined category was "adults," the requested algorithm might make it possible to sort them into two categories: "men" and "women."

Thus, the data entered by the users, which may include sensitive information such as age, gender, payment information, salaries, illnesses, etc., are not copied and transmitted for analysis for a sort except during the phase for defining the sorting algorithm, therefore for a limited amount of time. Furthermore, this transmission only relates to the user terminals of the samples, the number of which is very small compared to the user terminals to be sorted.

Next, the determination of the class to which the terminals belong takes place locally to the telephone; only the indication of the class may be transmitted over the network, but not the data themselves.

Therefore, a data mining method according to the invention for data entered on a terminal in order to determine a sort significantly increases the security of user terminals.

In one embodiment, each category is associated with words that make it possible to execute the sort on all types of data, and not only websites as in the solutions of the prior art using the Nielsen Net Ratings database. The sorting is therefore further refined.

Furthermore, given the small number of user terminals of the samples, it is possible to contact them and have them sign an agreement regarding the fact that their data will be copied and used in order to determine sorting algorithms. This use will thus be done with their agreement and not without their knowledge, thereby limiting the sensitivity of certain data.

The volume of necessary resources (computations and databases) is also significantly reduced relative to the prior art.

In the considered embodiment, the server 107 is connected to the communication network 101, but other embodiments are possible.

A method according to the invention further makes it possible to safely and quickly monitor evolutions in user profiles and behaviors. In fact, steps 130 to 132 for defining a sorting algorithm into categories $cat1_{CL1}$, $cat2_{CL1}$, ..., $catN_{CL1}$ may be reiterated regularly from the same samples or other samples.

If the sorting algorithm provided at the end of these reiteration of steps 130 to 132 is different from that previously determined, which indicates an evolution in user behavior, this new sorting algorithm is provided to the user terminals to be sorted, for example by downloading, replacing the previous algorithm.

A method according to the invention can build sorting algorithms in any number of categories and for all types of categories.

In one embodiment, the sorting algorithm is integrated into the operating system of the terminals, which allows the algorithm to access all of the data entered by the user.

What is claimed is:

1. A processing method in a system comprising a first device and a plurality of second devices arranged to be connected with the first device via a data link, each second device being a user terminal and arranged to receive batches of data from an associated user to be sorted into N categories, the method comprising:
performing an algorithm determination operation at said first device to build a sorting algorithm for sorting batches of data received by each second device into N categories, wherein said algorithm determination operation is performed according to the following (i) and (ii):
(i) generating a data sample for each of the N categories; and
(ii) according to data received by the first device for the data sample, determining within the first device the sorting algorithm according to consecutive iterations of a definition algorithm executed in the first device;
downloading, from the first device, the sorting algorithm for storage in each of the second devices;
executing, within each second device, the sorting algorithm in order to determine a respective category from among the N categories for each batch of data received by the second device; and
selectively triggering an action according to the category determined for said received batch of data,
wherein the sorting algorithm comprises sorting rules, each sorting rule being associated with one from among the N categories, each sorting rule including at least one logic sequence aiming to selectively associate at least one determined key element with a given category,
wherein the first device is a server, the plurality of second devices are user terminals connected to a platform of services through a telecommunications network, and the batches of data received by each user terminal are data entered on that user terminals and transmitted on the network to the platform of services, wherein:
the sorting algorithm determines, for each user terminal, a respective category from among the N categories, according to the data entered on the user terminal and transmitted on the network to the platform of services, and
during the step (i), the data sample is a sample of user terminals formed for each of the N categories, the data entered on the user terminals and transmitted on the network by the user terminal to the platform of services further being transmitted to the server.

2. The processing method according to claim 1, wherein, during the step (ii), a key element is removed from the data received when the number M of inclusions of the key element in a set of several sorting rules determined during the previous iterations is greater than or equal to 2.

3. The processing method according to claim 1, wherein, during the step (ii), each sorting rule is evaluated from test copies for each category, and the evaluation is weighted as a function of the number of test copies in each category.

4. The processing method according to claim 1, wherein the action is selectively triggered to at least some of said user terminals according to the category respectively determined for those terminals.

5. The processing method according to claim 4, wherein the sorting algorithm has been downloaded into the user terminals by the network.

6. The processing method according to claim 4, wherein the action is commanded by the platform of services in response to the transmission by the user terminal of an indication of the determined category at the platform of services.

7. The processing method according to claim 4, wherein the action comprises a request to send the user terminal a sorting algorithm in sub-categories of the category determined for the user terminal.

8. The processing method according to claim 1, wherein the steps (i) and (ii) having been reiterated, if the sorting algorithm according to the N categories that is obtained is distinct from the sorting algorithm according to the N categories stored in the second device, the sorting algorithm according to the N categories then obtained is downloaded and stored in the second device.

9. The processing method according to claim 1, wherein the analysis of the data done by the sorting algorithm is made up exclusively of the detection of words and logic combinations of detected words.

10. A first device equipped with a memory and a central processing unit, and capable of receiving data for a data sample formed for each of N categories, in which a sorting algorithm for sorting into the N categories is built by the first device according to consecutive iterations of a definition algorithm executed in the first device, the sorting algorithm to be executed on each of a plurality of second devices for sorting batches of data received by each of the plurality of second devices from associated users into said N categories,
wherein the sorting algorithm comprises sorting rules, each sorting rule being associated with one from among the N categories, each sorting rule including at least one logic sequence aiming to selectively associate at least one determined key element with a given category, and the first device is configured to enable the sorting algorithm to be downloaded to each of the second devices,
wherein the first device is a server, the plurality of second devices are user terminals connected to a platform of services through a telecommunications network, and the batches of data received by each user terminal are data entered on that user terminals and transmitted on the network to the platform of services, wherein:
the sorting algorithm determines, for each user terminal, a respective category from among the N categories, according to the data entered on the user terminal and transmitted on the network to the platform of services, and
during the step (i), the data sample is a sample of user terminals formed for each of the N categories, the data entered on the user terminals and transmitted on the network by the user terminal to the platform of services further being transmitted to the server.

11. A second device equipped with a memory and a central processing unit, and capable of receiving batches of data from an associated user to be sorted into N categories, in which a sorting algorithm for sorting into the N categories, stored in the memory and executable on the central processing unit, is configured to determine, for each received batch of data, a respective category from among N categories;
said sorting algorithm among the N categories being downloaded for storage in the second device and having previously been built by a first device performing an algorithm determination operation according to the following (i) and (ii):
(i) a data sample for each of the N categories; and
(ii) according to data received by a first device for the data sample, determining the sorting algorithm according to consecutive iterations of a definition algorithm executed in the first device, wherein the sorting algorithm comprises sorting rules, each sorting rule being associated with one from among the N categories, each sorting rule including at least one logic sequence aiming to selectively associate at least one determined key element with a given category, wherein the first device is a server, the plurality of second devices are user terminals connected to a platform of services through a telecommunications network, and the batches of data received by each user terminal are data entered on that user terminals and transmitted on the network to the platform of services, wherein:

the sorting algorithm determines, for each user terminal, a respective category from among the N categories, according to the data entered on the user terminal and transmitted on the network to the platform of services, and during the step (i), the data sample is a sample of user terminals formed for each of the N categories, the data entered on the user terminals and transmitted on the network by the user terminal to the platform of services further being transmitted to the server.

12. The second device according to claim 11, adapted for transmitting, on the telecommunications network, an indication of the determined category for said user terminal.

13. The second device according to claim 11, adapted for, based on the determined category, transmitting a request relative to a sorting algorithm within sub-categories of the category determined for said user terminal.

14. A non-transitory storage medium which has stored thereon a computer program to be installed on each of a plurality of second devices equipped with a memory and a central processing unit, comprising instructions for carrying out the following steps when the program is executed by the central processing unit of each of the second devices, each of the second devices being arranged to receive batches of data from an associated user to be sorted among N categories, the second devices being connected with a first device via a data link, said computer program comprising a sorting algorithm for sorting batches of data received by each second device into N categories:

executing the sorting algorithm stored in the memory and executable on the central processing unit, to determine, for each batch of data, a respective category from among N categories;

said sorting algorithm being previously built by a first device performing an algorithm determination operation according to the following (i) and (ii);

(i) generating a data sample for each of the N categories; and (ii) according to data received by the first device for the data sample, determining the sorting algorithm according to consecutive iterations of a definition algorithm executed in the first device, wherein the sorting algorithm comprises sorting rules, each sorting rule being associated with one from among the N categories, each sorting rule including at least one logic sequence aiming to selectively associate at least one determined key element with a given category, wherein the first device is a server, the plurality of second devices are user terminals connected to a platform of services through a telecommunications network, and the batches of data received by each user terminal are data entered on that user terminals and transmitted on the network to the platform of services, wherein:

the sorting algorithm determines, for each user terminal, a respective category from among the N categories, according to the data entered on the user terminal and transmitted on the network to the platform of services, and during the step (i), the data sample is a sample of user terminals formed for each of the N categories, the data entered on the user terminals and transmitted on the network by the user terminal to the platform of services further being transmitted to the server.

* * * * *